May 2, 1950 H. C. ROWE 2,506,279

SOUND ACTUATED SIGNAL DEVICE FOR TELEPHONES

Filed May 3, 1947

INVENTOR.
Harry C Rowe.
BY
Wilkinson, Huxley, Byron & Hume.
Attys.

Patented May 2, 1950 2,506,279

UNITED STATES PATENT OFFICE 2,506,279

SOUND ACTUATED SIGNAL DEVICE FOR TELEPHONES

Harry C. Rowe, Chicago, Ill.

Application May 3, 1947, Serial No. 745,836

5 Claims. (Cl. 179—2)

This invention relates to sound actuated signal devices adapted to be used to indicate the existence of certain conditions in a telephone circuit. More particularly it is a device which may be utilized, when a telephone conversation has been temporarily discontinued without breaking the connection, to give a suitable signal to one of the parties who has left the telephone that the connected party is ready to resume the conversation.

It is often necessary for one of the parties engaged in a telephone conversation to leave the phone temporarily. This normally means that even though no intelligence is being exchanged, the other party must remain at the telephone and await the return of the first-mentioned party. This can be a great inconvenience as well as time consuming, which time could be better spent in more productive activity.

Therefore, it would obviously be very desirable to have a device available which could be used in conjunction with a telephone to automatically signal the return of the first-mentioned party to the telephone. The other party could then return to the telephone and the conversation could be resumed. For various reasons it would be desirable to have the device so constructed that there is no electrical connection needed with the telephone with which it is used. One of these is the undesirability of having to make any modification on already existing telephone circuits which would be both costly and inconvenient, and perhaps would not be feasible in many instances. Another is that it would be desirable to be able to utilize the device with any one of several telephones merely by establishing the proper physical relationship between that phone and the device, when the phone is temporarily put down. In other words, an auxiliary rack or cradle of some sort would have a natural utility, and it could be constructed as a part of the device embodying the invention, so that the device would be put in an operative condition when a hand set is placed on that rack or cradle. This arrangement would allow the use of one such device with any number of separate telephones which are within reach of the device, since any of the hand sets could be placed on the rack or cradle as desired.

It is therefore an object of this invention to provide a sound actuated signal device adapted to be used with a telephone under the conditions described, to give a suitable signal to the party using the device that the connected party is ready to resume the conversation.

It is another object of this invention to provide a sound actuated signal device of the character described which is so constructed that no electrical connection with the telephone with which it is used is necessary.

It is another object of this invention to provide a sound actuated signal device which may be used with any number of telephones, so long as they are disposed so that the hand set may be physically coupled to the device.

It is still another object of this invention to provide a sound actuated signal device which is of relatively simple design and which is economical to manufacture, to install and to operate.

Still another object of this invention is to provide a sound actuated signal device which can be adapted to give either a visual or auditory signal, or both, if desired.

Further objects and advantages of this invention will become evident as the description proceeds and from an examination of the accompanying drawing which illustrates one embodiment of the invention and in which similar numerals refer to similar parts throughout the several views.

Figure 1:
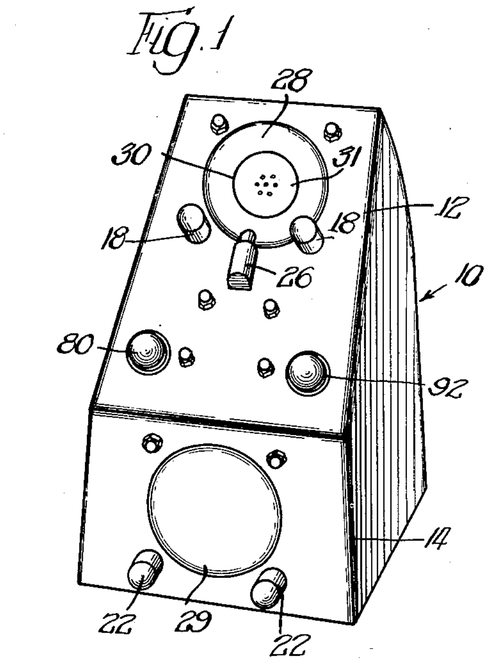
Fig. 1 is a perspective view of a device embodying one form of this invention.
Figure 2:
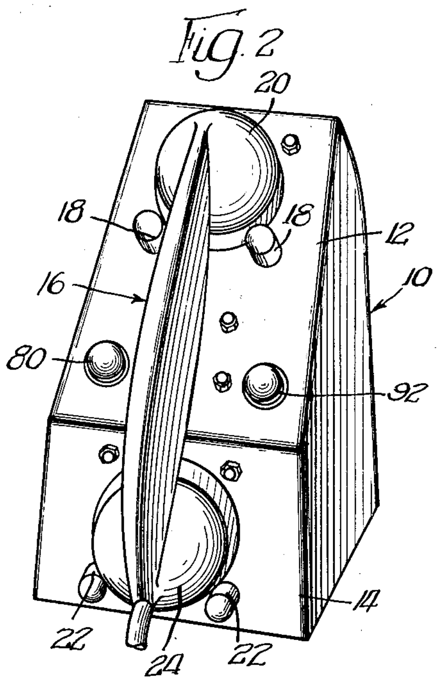
Fig. 2 is a perspective view of the device shown in Fig. 1 with a telephone hand set in operative position on the device.

Referring now to Figs. 1 and 2, the signal device, generally designated by the numeral 10, has a front face comprising an angularly disposed section 12 which is an extension of the vertical section 14. The angular disposition of these two front face sections, with respect to each other, adapts the device to receive the telephone hand set 16 as shown in Fig. 2. The two supporting posts 18—18 on the angularly disposed portion 12 of the front face are adapted to support the receiver end 20 of the hand set 16 when the latter is properly disposed on the signal device as shown in Fig. 2. Likewise the two supporting posts 22—22 on the vertically disposed section 14 of the front face of the device are adapted to support the microphone end 24 of the hand set 16 when the latter is so disposed.

Immediately above the supporting posts 18—18 and tangent thereto is the circular section 28 of resilient material. The microphone 30 is centrally disposed in this resilient material and its exposed face 31 is substantially flush therewith.

Likewise, the circular section 29 of resilient material is disposed immediately above and equidistant from the supporting posts 22—22. These two sections 28 and 29 of resilient material are adapted to cushion the receiver and microphone ends of the hand set 16, respectively. In addition, these resilient sections are adapted to substantially seal the receiver and microphone of the hand set from the surrounding area when the hand set is disposed on the signal device 10 as in Fig. 2. Therefore substantially no stray sound vibrations will enter the microphone end of the hand set, nor will any vibration other than those produced by the receiver in the hand set reach the microphone 30. The plunger-type switch member 26 centrally disposed between the supporting posts 18—18 and adjacent the section 28 of resilient material is adapted to be operated by the receiver end 20 of the hand set 16 when it is disposed on the signal device as shown in Fig. 2. This disposition of the hand set and the resultant depression of the plunger of the switch member 26 normally puts the signal device in operative condition so that upon the return of the connected party to the telephone and a resumption of the conversation by him, the receiver end 20 of the hand set will be actuated and will cause sound vibrations to be transmitted directly to the microphone 30.

The signal device will then normally produce a signal to attract the attentions of the user, which may be in the form of the glowing of the signal light 80, or the sounding of a buzzer, or both. The operation of these will be more fully described below.

Figure 3:
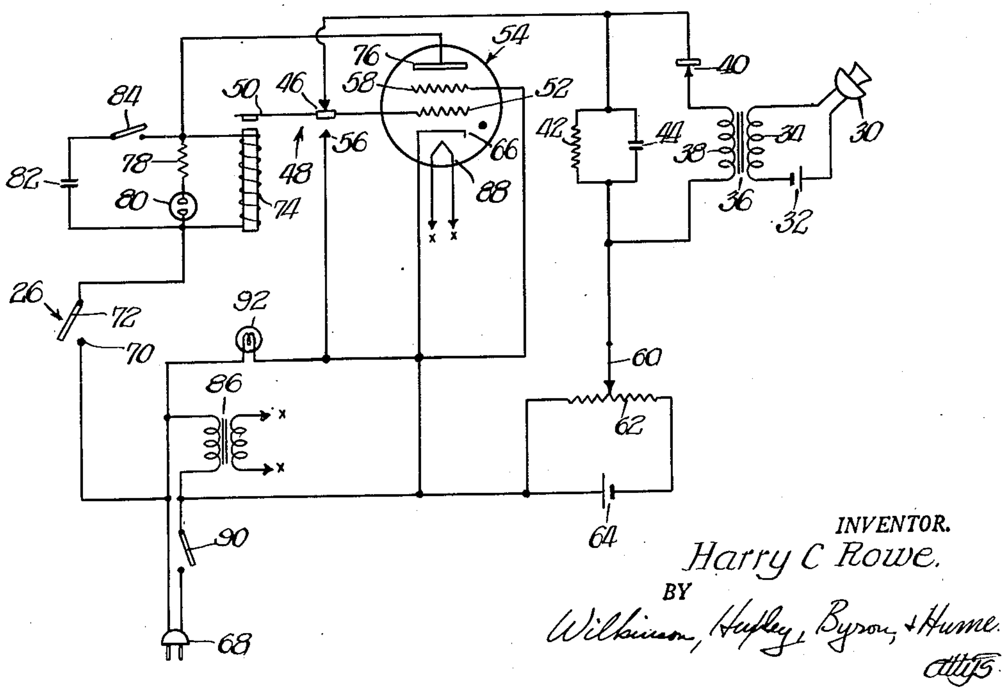
Fig. 3 is a circuit diagram of the embodiment of the invention shown in Fig. 1.

Referring now to Fig. 3, the schematic diagram of the signal device, the microphone 30 is shown connected to and adapted to be energized by a source of direct current which is here indicated as a battery 32. The microphone circuit includes the primary winding 34 of the transformer 36. Consequently any sound vibrations received by the microphone will be reproduced in the form of variations of the electrical current flowing through the primary winding 34. The secondary winding 38 of the transformer 36 is energized by these variations in the electrical current in the primary winding 34. The crystal rectifier 40, together with the resistor 42, are connected to form a closed circuit between the two ends of the secondary winding 38 and the condenser 44 is shunted across the resistor 42.

Electrically connected to this circuit between the crystal rectifier 40 and the resistor 42 is the contact point 46 of the relay 48. The relay arm 50 is connected to the control grid 52 of the thyraton tube 54 and the contact point 56 of the relay 48 is connected to the cathode 66 and the screen grid 58. The movable arm 60 of the variable resistor 62 is connected to the end of the resistor 42 that is not connected to the crystal rectifier 40. The potentiometer 62 is connected across the source of electrical potential 64. The positive side of this source of electrical potential is connected to the cathode 66 of the tube 54 and also to one side of the plug 68 which is adapted to be plugged into a source of alternating line current. The opposite side of the plug 68 is connected to the contact point 70 of the switch member 26. The movable arm 72 of this switch member is connected to one end of the winding 74 of the relay 48. The opposite end of the winding 74 of the relay 48 is connected to the anode 76 of the tube 54. The resistor 78 and the glow discharge tube 80 are shunted in series across the winding 74. The condenser 82 is also adapted to be shunted across the winding 74 by closing the manually operated switch 84. The transformer 86 is shown as a source of current for the heater 88 of the tube 54.

Although the sources of electrical potential 32 and 64 have both been shown in this schematic diagram as batteries, it should be understood that a suitable power supply could be incorporated in the device to replace them. Also, no provision has been made for opening and closing the two circuits which include these two sources of electrical potential. It is contemplated that the switch member 26 might be used to close either or both of these circuits as well as the circuit connecting the plug 68 to the relay winding 74. A master switch 90 can be used to control the connection of the line current to the device, and the signal lamp 92 gives a visual indication when such connection is made.

When the device is to be used in the way described above the plug 68 is connected to a source of suitable alternating line voltage and the master switch 90 is closed. This energizes the transformer 86 which is the source of electrical energy for the heater 88 of the tube 54 as shown in Fig. 3. The energizing of the heater 88 puts the tube 54 in operative condition. If the two sources of electrical potential 32 and 64 are also connected to their respective circuits, the signal device is ready for actual operation. The movable arm 60 of the potentiometer 62 has been previously adjusted so that a suitable negative potential is applied to the control grid 52 of the tube 54 through the contact point 46 of the relay 48 which is normally in the position shown in Fig. 3. This negative potential is such that will prevent the firing of the tube 54 when the alternating line voltage is applied to the plate of the tube as will subsequently be described. The switch member 26 is normally in an open position, so that when the hand set is not on the device there is normally no potential applied to the plate 76 of the tube 54.

When it is desired to use the device, after the connected party has left the telephone, the other party places the hand set 16 on it in the manner shown in Fig. 2. Such disposition of the hand set 16 causes the switch member 26 to close, which applies the line voltage to the anode 76 through the relay winding 74, but the negative potential applied to the control grid 52 keeps the tube from firing.

The hand set is now in such a position that the microphone 30 and the circuit in which it is included will now be energized to any sound vibrations emanating from the receiver end 20. When the voice frequencies from the receiver end of the hand set excite the microphone 30, the output of the transformer 36 is rectified by the crystal rectifier 40 which rectified current creates a potential drop across the resistor 42 and a positive potential is therefore applied from the positive side of the resistor 42 to the grid 52, through the contact point 46 of the relay 48. This positive potential sufficiently overcomes the negative potential applied to the control grid 52 from the variable resistance 62 through the movable arm 60, the resistor 42 and the contact point 46 of the relay 48, so that the tube 54 fires. The firing of the tube 54 closes the circuit from the source of line voltage through the tube and the resulting anode current through the relay winding 74 immediately draws the relay arm 50 out of contact with the contact point 46 and into contact with the contact point 56. When the relay arm 50 is so moved the control grid 52 is connected directly to the cathode 56. This condition continues as long as the anode current continues to flow through the relay winding 74, which continues, in turn, as long as the tube remains fired.

The line voltage applied from the plug 68 through the closed switch member 26 to the anode 76 of the tube 54 has a significant effect on the condition of the tube. The alternating character of the line current causes the anode potential to swing from a very positive value to an equally negative value during each cycle as long as switch member 26 is closed. When the anode potential reaches a value low enough to deionize the tube it stops conducting and the relay arm 50 immediately starts to return to the contact point 46. This occurs since the current flowing through the relay winding 74 is cut off when the tube 54 stops conducting and since the arm 50 is normally urged toward contact point 46 when the relay is not energized.

Because of the relatively slow movement of the relay arm 50, the anode potential swings to a positive value sufficient to cause the tube to again fire, before the arm 50 reaches the contact point 46. The control grid 52 is floating during the time that the relay arm 50 is moving away from the contact point 56 and therefore has no appreciable influence on the effect of the cyclic variations of the potential of the anode 76. The relay arm is again pulled toward the contact point 56 when the tube fires. When it has again made contact with that point, the same cycle begins again. This will continue as long as switch member 26 remains closed, or in other words, until the hand set 16 is removed from the signal device 10.

The recurrent striking of the contact point 56 by the relay arm 50 produces sound vibrations which may be utilized as an audible signal to attract the attention of the party using the device, when the connected party resumes the conversation.

The glow discharge lamp shunted across the relay winding 74 also gives a visual indication when the tube is firing, since current will flow through the lamp and resistor 78 under such conditions, as well as through the relay winding 74. The buzzing of the relay 48 coupled with the glow of this lamp provides a very effective signal for attracting the attention of the party using the device.

If it is desired to use the lamp 80 alone, without the buzzing of the relay 48, as a signaling means, the condenser 82 may be shunted across the relay winding 74 by closing the switch 84. When it is so connected in the circuit this condenser smooths out the pulsating direct current flowing through the relay winding when the tube 54 is conducting. This, in turn, establishes an average direct current level high enough to cause the relay arm 50 to be held continuously against contact point 56. The lamp 80 therefore glows as before but the buzzing signal is eliminated.

Once switch member 26 has been closed and the tube has been fired by the proper actuating vibrations created by the receiver of the hand set 16, the tube will continue to fire until switch member 26 is opened. Further vibrations created by this receiver will have no effect on the signal device, once it has started to produce a signal.

The negative potential normally applied to the control grid 52 from the potentiometer 62 may be adjusted by setting the adjustable arm 66. It is possible to adjust this bias voltage so that the tube will not be fired except by sounds of a particular intensity, actuating the microphone 30. Because stray sound vibrations, or random signals such as interference or static might otherwise cause the tube 54 to fire and the signal device to give an indication that the called party is ready to resume the conversation when he is in fact not so ready, this type of control is highly desirable.

Although the resilient sections 28 and 29 are illustrated as being substantially flush with their respective front face sections, it may be desirable to give them a peripheral edge in the form of a vertically projecting rim which is adapted to enclose the outer edges of the receiving end 20 and the microphone end 24 of the hand set. These two projecting rims will then act as baffles in preventing undesired sound vibrations from leaking through so that room noises or the like will be more positively prevented from actuating either the microphone 30 or the microphone end 24 of the hand set.

After the signal device has started to generate a signal, it will continue to do so until the switch member 26 is opened by removing the hand set. This opening of switch member 26 removes the alternately positive and negative potential from the anode 76, so the tube 54 immediately stops conducting. This, in turn stops the flow of current through the relay winding 74, so that the relay arm 50 is allowed to return to its normal position and to make contact with point 46. The negative potential is then applied to the control grid 52 as discussed above and the tube 54 will remain cut off until this bias voltage is reduced, even though the line voltage is applied to the anode 76 by closing switch member 26. The device may therefore readily be reset if accidentally set off by merely lifting the hand set from the device to open switch member 26 long enough to allow the relay arm 50 to return to the normal position as described.

The drawing and the above discussion are not intended to represent the only possible form of this invention, in regard to details of construction. Changes in form and in the proportion of parts, as well as the substitution of equivalents are contemplated, as circumstances may suggest or render expedient, without departing from the spirit or scope of this invention.

What is claimed is:

1. A sound actuated signal device comprising a gas-filled rectifier tube having a cathode, an anode and a control electrode, means for coupling the anode-cathode circuit to a source of alternating current at will, a source of negative bias voltage for said control electrode of sufficient amplitude to normally prevent said tube from firing when said source of alternating current is connected to said anode-cathode circuit, a microphone. a source of direct current for energizing said microphone, a rectifying device coupled to said microphone circuit and poled to pass the positive pulses produced by activation of said microphone, resistance means in the rectifying device circuit, said control electrode being connected to the positive side of said resistance means so that when said microphone is sufficiently activated a positive voltage is impressed on said control electrode and said tube fires when said anode-cathode circuit is coupled to said source of alternating current, and solenoid controlled switch means normally connecting said source of bias voltage and the positive side of said resistance means to said control electrode, said solenoid being in said anode-cathode circuit and disposed so that said switch means disconnects said control electrode from said source of negative bias voltage and said positive side of said resistance means when said tube initially fires, and thereafter intermittently connects said control electrode to said cathode during each successive positive cycle of said alternating current until said anode-cathode circuit is disconnected from said source of alternating current.

2. A sound activated signal device adapted to be used with a telephone hand set comprising a housing adapted to support said hand set, a microphone associated with said housing so that the receiver portion of said telephone hand set is in close association therewith when said hand set is supported by said housing, a gas filled rectifier tube having a cathode, an anode and a control electrode, means for coupling the anode-cathode circuit to a source of alternating current at will, switch means in said anode-cathode circuit adapted to be closed by said hand set when the latter is supported by said housing, a source of negative bias voltage normally connected to said control electrode, said bias voltage being of sufficient amplitude to normally prevent said tube from firing when said source of alternating current is connected to said anode-cathode circuit, means for energizing said microphone, means for coupling the microphone circuit to said control electrode so that said microphone is adapted to impress a positive counter voltage thereon when activated, said counter voltage being adapted to cause said tube to fire when of sufficient amplitude, and solenoid controlled switch means normally connecting said source of bias voltage and the source of counter voltage to said control electrode, said solenoid being in said anode-cathode circuit and disposed so that said last named switch means disconnects said control electrode from said sources when said tube initially fires and thereafter momentarily connects said control electrode to said cathode during each successive positive cycle of said alternating current until said first named switch means is opened.

3. A sound activated signal device of the character described in claim 2, further characterized in that said last named switch means comprises a solenoid, an arm activated by said solenoid, and contact means on said arm adapted to creating audible sound when said arm is moved so that said control electrode is repeatedly connected to said cathode.

4. A sound activated signal device of the character described in claim 2, further comprising visual signal generating means in said anode-cathode circuit adapted to be energized when said tube fires.

5. A sound activated signal device of the character described in claim 2, further comprising resistance means for adjusting the amount of negative bias voltage normally applied to said control electrode, so that the intensity of sound required to cause said tube to fire may be selectively adjusted.

HARRY C. ROWE.

REFERENCES CITED

The following references are of record in the file of this patent:

UNITED STATES PATENTS

| Number | Name | Date |
|---|---|---|
| 1,690,279 | Craft | Nov. 6, 1928 |
| 1,765,471 | Wensley | June 24, 1930 |
| 1,872,372 | Wensley | Aug. 16, 1932 |
| 2,070,089 | Harris | May 4, 1937 |
| 2,079,089 | Varley | May 4, 1937 |
| 2,311,445 | Kerr | Feb. 16, 1943 |

FOREIGN PATENTS

| Number | Country | Date |
|---|---|---|
| 269,506 | Italy | Nov. 21, 1929 |
| 764,939 | France | Mar. 5, 1936 |